US007542666B2

United States Patent
Nakagomi

(10) Patent No.: US 7,542,666 B2
(45) Date of Patent: Jun. 2, 2009

(54) METHOD AND APPARATUS FOR IMAGE BLUR CORRECTION

(75) Inventor: Kouichi Nakagomi, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 479 days.

(21) Appl. No.: 11/500,750

(22) Filed: Aug. 8, 2006

(65) Prior Publication Data

US 2007/0036530 A1  Feb. 15, 2007

(30) Foreign Application Priority Data

Aug. 15, 2005 (JP) .............................. 2005-235271

(51) Int. Cl.
*G03B 17/00* (2006.01)
(52) U.S. Cl. .................. 396/54; 396/52; 348/208.1; 348/208.4; 348/208.6; 348/208.99
(58) Field of Classification Search ................. 396/52, 396/54; 33/1 M; 348/208.1, 208.4, 208.6, 348/208.99
See application file for complete search history.

(56) References Cited

U.S. PATENT DOCUMENTS 5,706,051 A * 1/1998 Mogamiya ................... 348/337
7,057,645 B1 * 6/2006 Hara et al. ............... 348/208.6
2004/0165872 A1 * 8/2004 Nanjo et al. ................ 396/18
2005/0052570 A1 * 3/2005 Enomoto .................... 348/375

FOREIGN PATENT DOCUMENTS

JP  10-173992 A  6/1998
JP  2005-049591 A  2/2005

OTHER PUBLICATIONS

Chinese Office Action (and English translation thereof) dated Dec. 14, 2007, issued in a counterpart Chinese Application.

* cited by examiner

*Primary Examiner*—W. B. Perkey
*Assistant Examiner*—Warren K Fenwick
(74) *Attorney, Agent, or Firm*—Frishauf, Holtz, Goodman & Chick, P.C.

(57) ABSTRACT

An image-capturing apparatus includes a first image pickup element which picks up an actual image of a subject, a second image pickup element which detects a displacement and has sensitivity that is higher than that of the first image pickup element, an image pickup unit for picking up an image of the subject by driving the first image pickup element and the second image pickup element simultaneously, a displacement detecting unit for computing an amount of displacement between images due to a camera shake using image data obtained from the second image pickup element when the image of the subject is picked up by the image pickup unit, and a position correcting unit for correcting a position of image data obtained from the first image pickup element, based on the amount of displacement computed by the displacement detecting unit.

10 Claims, 8 Drawing Sheets

METHOD AND APPARATUS FOR IMAGE BLUR CORRECTION

CROSS-REFERENCE TO RELATED APPLICATIONS

This application is based upon and claims the benefit of priority from prior Japanese Patent Application No. 2005-235271, filed Aug. 15, 2005, the entire contents of which are incorporated herein by reference.

BACKGROUND OF THE INVENTION

1. Field of the Invention

The present invention relates to an image-capturing apparatus such as a digital camera. More specifically, the invention relates to an image-capturing apparatus having a camera shake correcting function, an image processing method applied to the image-capturing apparatus, and a program used in the image-capturing apparatus.

2. Description of the Related Art

There has recently been proposed a method of forming a low-noise, clear image without any blur in digital cameras. Such an image can be formed by performing a continuous shoot in short exposure time instead of one shoot in long exposure time and then superposing a plurality of images obtained by the continuous shoot.

Even though the time interval between frames in the continuous shoot is short, there is possibility that a displacement will be caused between a camera and a subject during the time interval. In order to superpose the images, the displacement has to be corrected.

As a conventional method of detecting a displacement between images due to a camera shake, Jpn. Pat. Appln. KOKAI Publication No. 10-173992 discloses a method of detecting a displacement between two images, which are picked up with a time difference, by correlating the images.

When a strobe light cannot be used, or when a subject is located away from a camera such that it is not sufficiently reached by the flash of a strobe light, an image is picked up at low light level and its SN ratio is very low. The feature of the subject is therefore difficult to extract. Consequently, there occurs a problem that a displacement between images due to a camera shake cannot be detected correctly or any images cannot be superposed satisfactorily.

BRIEF SUMMARY OF THE INVENTION

The present invention has been developed in consideration of the above situation and an object thereof is to provide an image-capturing apparatus, an image processing method and a program capable of obtaining a good image without any blur by correctly detecting a displacement between images due to a camera shake.

According to one embodiment of the present invention, there is provided an image-capturing apparatus comprising a first image pickup element which picks up an actual image of a subject, a second image pickup element which detects a displacement and has sensitivity that is higher than that of the first image pickup element, an image pickup unit which picks up an image of the subject by driving the first image pickup element and the second image pickup element simultaneously, a displacement detecting unit which computes an amount of displacement between images due to a camera shake using image data obtained from the second image pickup element when the image of the subject is picked up by the image pickup unit, and a position correcting unit which corrects a position of image data obtained from the first image pickup element, based on the amount of displacement computed by the displacement detecting unit.

DETAILED DESCRIPTION OF THE INVENTION

Embodiments of the present invention will be described with reference to the accompanying drawings.

First Embodiment

Figure 1:
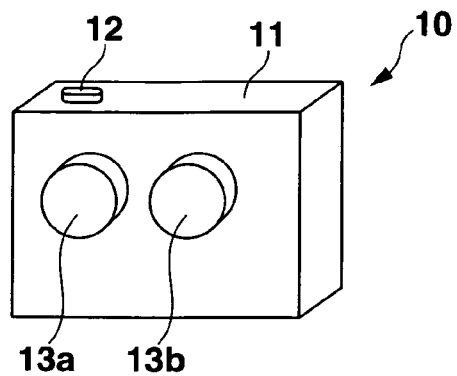
FIG. 1 is an external view showing a digital camera as an image-capturing apparatus according to a first embodiment of the present invention.

FIG. 1 is an external view showing a digital camera 10 as an image-capturing apparatus according to a first embodiment of the present invention;

The digital camera 10 includes a main body 11, and the main body has a shutter key 12 on its top. The shutter key 12 is designed to indicate image pickup timing.

Though not shown in particular, the main body 11 also has a power key, a mode key for selecting an image pickup mode and a playback mode, a menu key for displaying various menus regarding an image pickup operation, and the like. Further, the main body 11 has a liquid crystal display (not shown) on its back. A target subject is displayed on the liquid crystal display as a monitor image when its image is picked up, and the image stored in a memory is displayed thereon when the image is played back.

Two lenses 13a and 13b are arranged on the front of the main body 11, which faces a subject. One 13a of the lenses is used to pick up the actual image, while the other 13b is used to detect a displacement. These lenses are provided close to each other.

Figure 2:
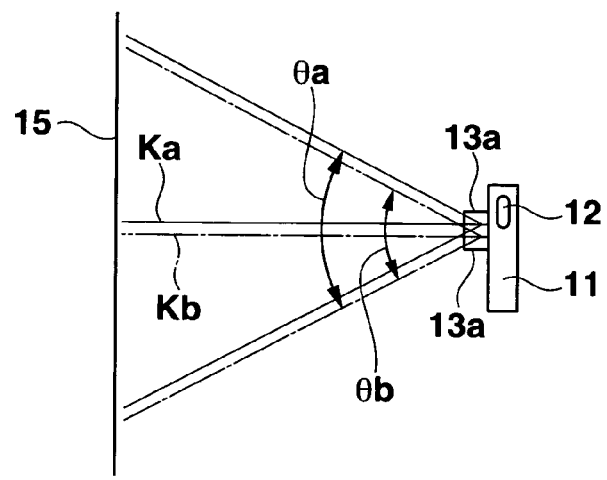
FIG. 2 is an illustration of a relationship between a subject and lenses of the digital camera according to the first embodiment.

FIG. 2 is an illustration of a relationship between a subject and the lenses of the digital camera 10. In FIG. 2, reference symbols Ka and Kb indicate the optical axes of the lenses 13a and 13b, reference symbols θa and θb indicate the field angles of the lenses 13a and 13b, and reference numeral 15 denotes a subject. The field angles of the lenses 13a and 13b are the same. The lenses 13a and 13b have the same magnification.

Figure 3:
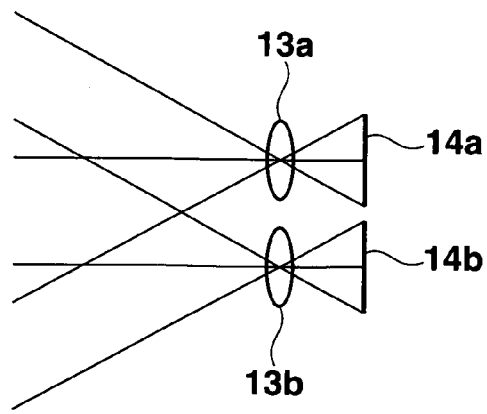
FIG. 3 is an illustration of a relationship between the lenses and image pickup elements of the digital camera according to the first embodiment.

FIG. 3 is an illustration showing a relationship between the lenses and image pickup elements of the digital camera 10. In FIG. 3, reference numerals 14a and 14b represent image pickup elements.

The image pickup elements 14a and 14b are incorporated in the main body 11 of the digital camera 10 so as to correspond to the lenses 13a and 13b, respectively. The elements 14a and 14b are each composed of, for example, a charge coupled device (CCD). The elements 14 and 14b receive light beams from the respective portions of the subject through the lenses 13a and 13b and output electrical signals corresponding to the levels of the light beams.

The image pickup element 14a is used to pick up the actual image and provided on the optical axis Ka of the lens 13a. The element 14a has sensitivity within a visible-light region in order to form the actual image.

Color filters are arranged in the Bayer pattern on the front of the element 14a. Filters for cutting light of the infrared (IR) region can be arranged thereon.

The image pickup element 14b is used to detect a displacement and provided on the optical axis Kb of the lens 13b. Since the element 14b is a monochrome one, it is not provided with any filters such as a color filter, an IR cut filter and an ultraviolet (UV) cut filter. The element 14b has high sensitivity capable of sensing very low-level light and can picks up a clear image of the feature of the outside shape of a subject even when the illuminance of light is low. The two image pickup elements 14a and 14b have the same pixel size and the same number of pixels, and are driven simultaneously when an image is picked up.

Figure 4:
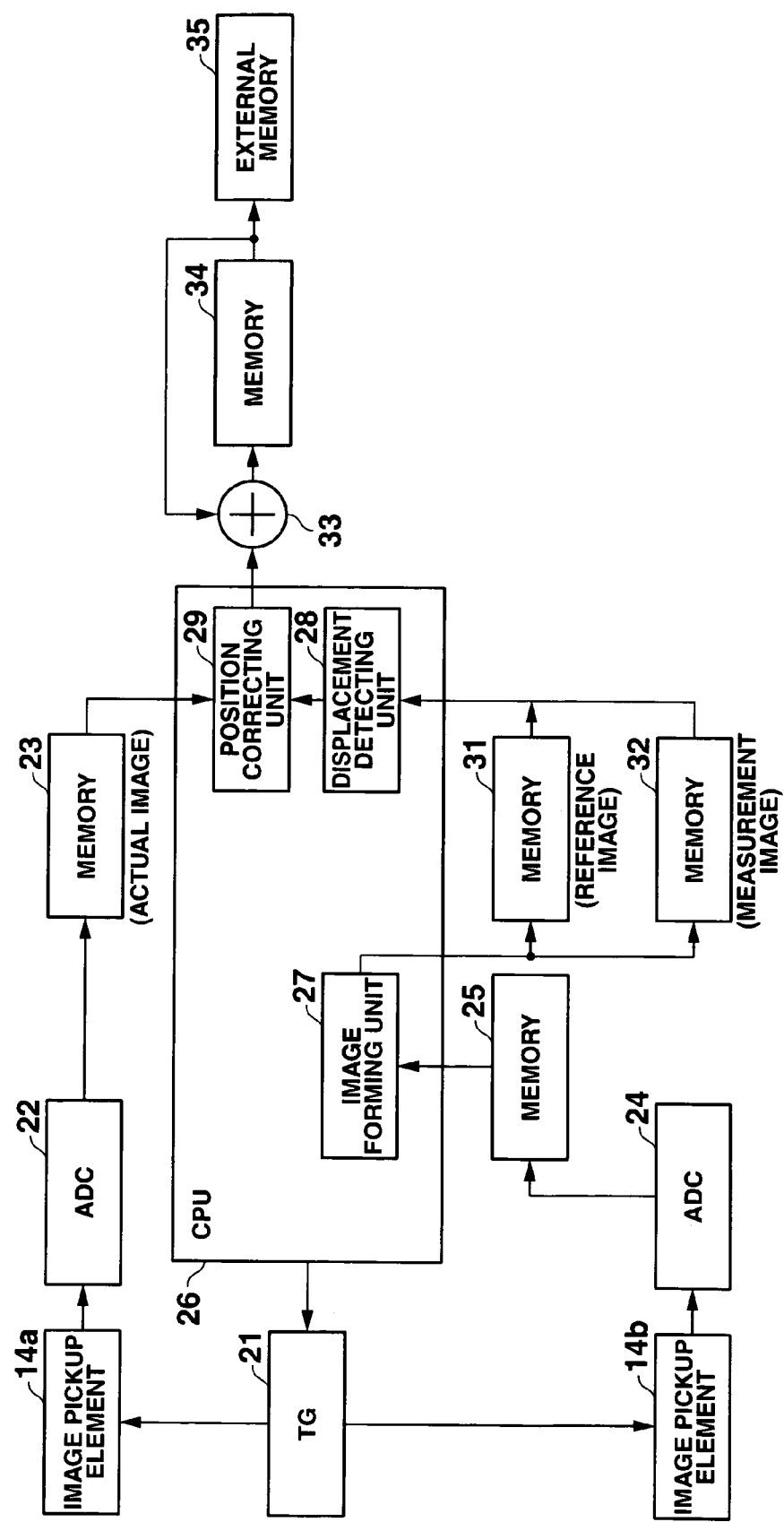
FIG. 4 is a block diagram of the circuit arrangement of the digital camera according to the first embodiment.

FIG. 4 is a block diagram of the circuit arrangement of the digital camera 10.

The image pickup element 14a of the digital camera 10 is a photoelectric conversion element having sensitivity within the visible-light region and also having color filters. The image pickup element 14b is a monochrome photoelectric conversion element having sensitivity within the IR region other than the visible-light region. The element 14b has no color filters but is capable of picking up an image with high sensitivity even when the illuminance of light is low.

The digital camera 10 includes a timing generator (TG) 21, an AD converter (ADC) 22, a memory 23, an AD converter (ADC) 24, a memory 25, a CPU 26, memories 31 and 32, an adding/averaging unit 33, a memory 34 and an external memory 35.

The timing generator (TG) 21 controls the image pickup element of the image pickup elements 14a and 14b. The AD converter (ADC) 22 converts an electrical signal output from the element 14a into digital image data. The memory 23 is a memory for storing the actual image. The image data that is supplied from the element 14a via the AD converter 22 is stored in the memory 23 as the actual image for one picture. The AD converter (ADC) 24 converts the electrical signal output from the element 14b into digital image data. The memory 25 is a memory for detecting a displacement. The image data obtained from the element 14b through the AD converter 24 is stored in the memory 25 for one picture.

The CPU 26 is a computer for controlling the operation of the digital camera 10. The CPU 26 reads a program out of a ROM, not shown, and performs various processes in accordance with the procedure described in the program.

The CPU 26 includes an image forming unit 27, a displacement detecting unit 28 and a position correcting unit 29. These units are provided as functional ones for performing the processes of the CPU 26.

On the basis of the image data stored in the memory 25, the image forming unit 27 forms an image whose displacement is easy to detect, and stores the image in one of the memories 31 and 32. The memories 31 and 32 are prepared for detecting a displacement. The memory 31 stores the initial one of the image data items, which are obtained in sequence by continuous image pickup, as a reference image, while the memory 32 stores the image data items subsequent to the initial data item one by one as a measurement image.

The displacement detecting unit 28 compares the reference image stored in the memory 31 and the measurement image stored in the memory 32 and computes an amount of displacement between the images due to a camera shake. On the basis of the amount of displacement, the position correcting unit 29 corrects the image data stored in the memory 23, or the position of the actual image and supplies it to the adding/averaging unit 33.

The adding/averaging unit 33 adds and averages the luminance values of pixels of the image data items obtained in sequence by the continuous image pickup to form a single composite image. In the adding/averaging unit 33 adds and averages the actual images whose positions are corrected by the position correcting unit 29, as ones to be combined, and stores the result in the memory 34 in the subsequent stage. Assume that the initial actual image corresponding to the reference image is stored in the memory 34 as it is and its subsequent actual images are superposed in sequence on the initial actual image.

The external memory 35 is a memory for storing the composite image, which is formed by the adding/averaging unit 33 and stored in the memory 34, as a picked-up image whose blur has been corrected. Actually, the composite image is compressed by, e.g., Joint Photographic Experts Group (JPEG) and the compressed image is stored in the external memory 35. For example, a flash memory is used as the external memory 35.

An operation of the digital camera according to the first embodiment will be described below.

The operation is performed when a given program is loaded into the CPU 26 serving as a microcomputer.

Figure 5:
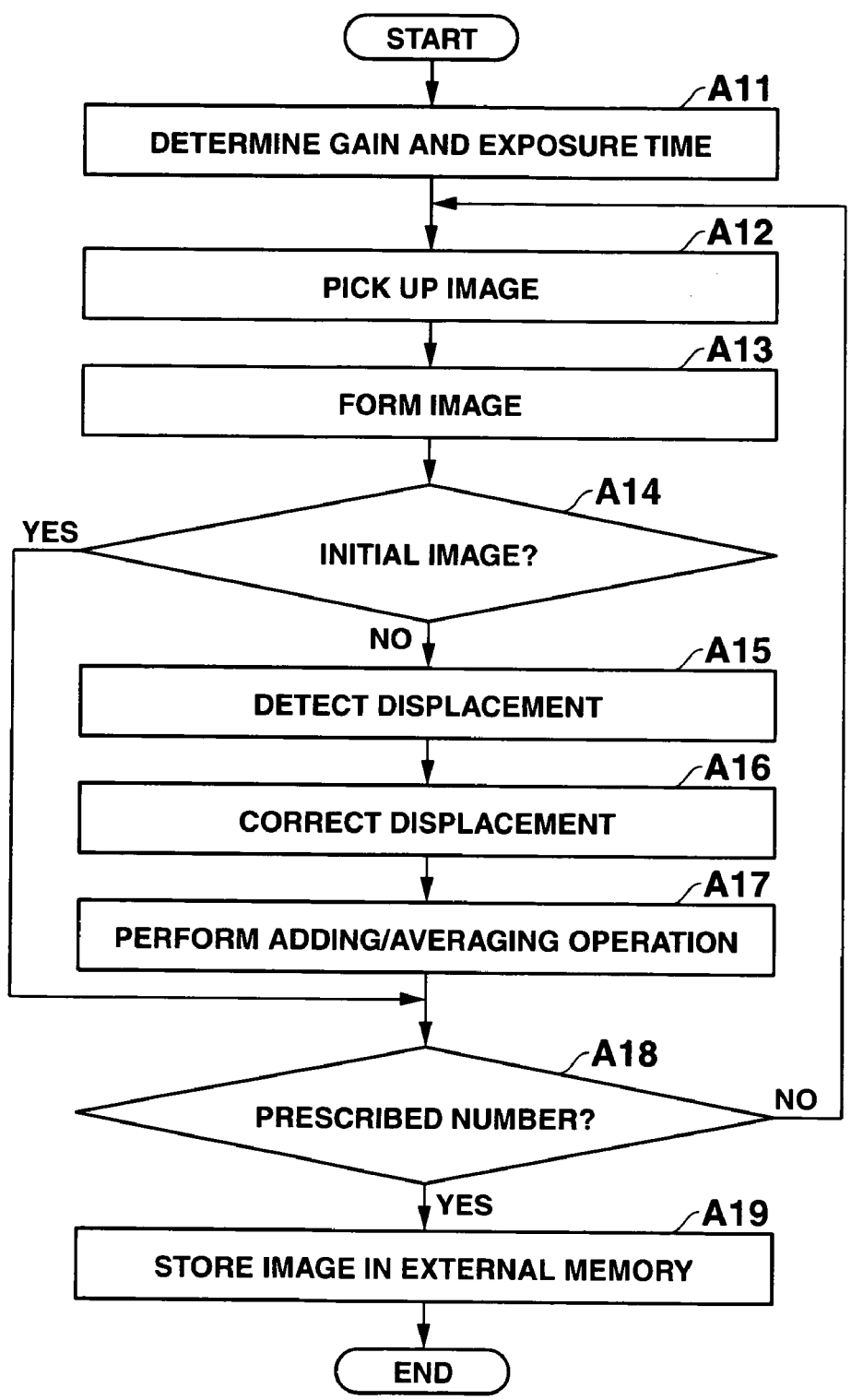
FIG. 5 is a flowchart showing a procedure for image processing of the digital camera according to the first embodiment.

FIG. 5 is a flowchart of the operation. The operation is performed to align a plurality of image data items (still images), which are obtained by continuous image pickup, and combine the image data items into an image whose blur has been corrected.

First, a gain and exposure time are set in the image pickup element 14a in accordance with the output status of the element 14a. Even though a camera shake occurs when an image is picked up, the exposure time is set in such a manner that the picked-up image is not so blurred. For example, it is desirable that the exposure time be 125 msec or shorter. The same exposure time is set for the image pickup element 14b, as is a gain that conforms to the output range of the ADC (step A11).

When the shutter key 12 is depressed to give an instruction to take a picture, the image pickup elements 14a and 14b are driven with the same timing in accordance with the gain and exposure time set in step A11, and image data for one picture is stored in each of the memories 23 and 25 through the corresponding one of the AD converters 22 and 23 which correspond to the pickup elements 14a and 14b (step A12).

The initial image data item stored in the memory 25 is processed in such a manner that the image forming unit 27 can easily detect a displacement and then the processed data item is stored in the memory 31 as a reference image (step A13). On the other hand, the initial image data item stored in the memory 23 is stored in the memory 34 as the initial image without any position correcting process or adding/averaging process (step A14).

It is then determined whether the processing of a prescribed number of images to be combined is completed (step A18). If the number of images does not reach the prescribed number (No in step A18), the flow returns to step A12, and the image data items subsequent to the initial image data item are sequentially picked up at regular time intervals. In this case, the actual image data item that is obtained from the image pickup element 14a is stored in the memory 23, and the image data item that is obtained from the image pickup element 14b is stored in the memory 25 in the second shot. After that, these image data items are processed by the image forming unit 27 and stored in the memory 32 as a measurement image. The initial image data item is stored in the memory 31 as a reference image.

The reference and measurement image data items stored in the memories 31 and 32 are supplied to the displacement detecting unit 28. The unit 28 thus computes an amount of displacement between the image data items due to a camera shake (step A15).

There are various methods of computing an amount of displacement between images as well as the above method disclosed in Jpn. Pat. Appln. KOKAI Publication No. 10-173992. The present invention is not limited particularly to these methods, but directed toward computing an amount of displacement using a known method.

The amount of displacement computed by the displacement detecting unit 28 is supplied to the position correcting unit 29. On the basis of the amount of displacement, the unit 29 corrects the position of the second actual image stored in the memory 23 such that it confirms to the initial image (step A16).

The second actual image whose displacement has been corrected is supplied to the adding/averaging unit 33. The unit 33 adds the luminance values of pixels of the actual image and those of pixels of the initial image stored in the memory 34 together and then averages the added values (step A17).

A prescribed number of images are continuously picked up in the same manner as described above. The actual images subsequent to the initial image, the displacement of which has been corrected, are added to the initial image, and the added images are averaged to form a composite image. This composite image is stored in the memory 34.

The adding/averaging process will be described as follows. In general, the correlation between signals corresponding to the same point of images is high, and an $n$-times value is obtained if images are added together $n$ times. Assuming that noise is random noise, it becomes zero by averaging the added images (time average) and thus the SN ratio improves $\sqrt{n}$ times. Therefore, combining process for a plurality of picked-up images has a effect as if the exposure time is extended and makes its output value n times stronger than its original value in proportion to the number of composite images. As a result the sensitivity increases $n$ times, and the SN ratio improves $\sqrt{n}$ times.

When the processing of a prescribed number of images is completed (Yes in step A18), the composite image is supplied from the memory 34 to the external memory 35 as an image whose blur has been corrected, and compressed and stored therein (step A19).

As described above, a use of the image pickup element 14b having high sensitivity in addition to the image pickup element 14a for picking up the actual images enables the camera to extract the features of a subject from image data items obtained in sequence from the image pickup element 14b to compute an amount of displacement between images correctly, even though an image is picked up at low light level. If, therefore, the actual images obtained in sequence from the image pickup element 14a are aligned and superposed one on another, a clear image whose camera shake components have been corrected can be formed.

Second Embodiment

A second embodiment of the present invention will be described below.

Figure 6:
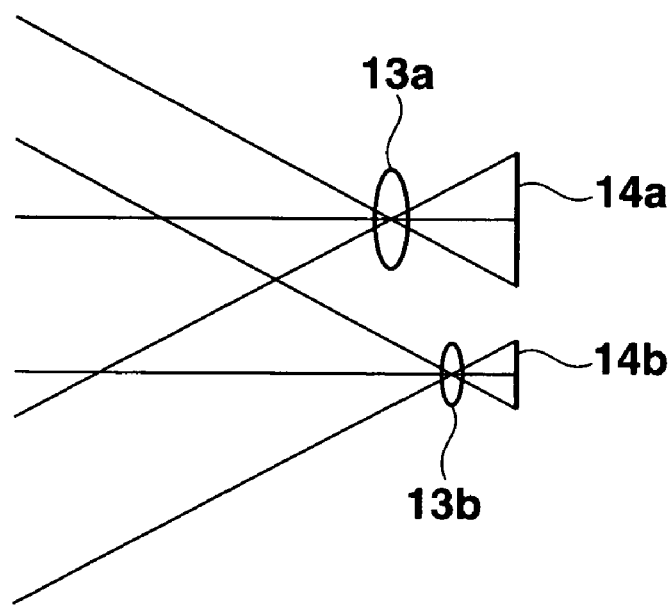
FIG. 6 is an illustration of an example of a digital camera according to a second embodiment of the present invention, which includes different lenses and different image pickup elements for picking up the actual image and for detecting a displacement between images.
Figure 7:
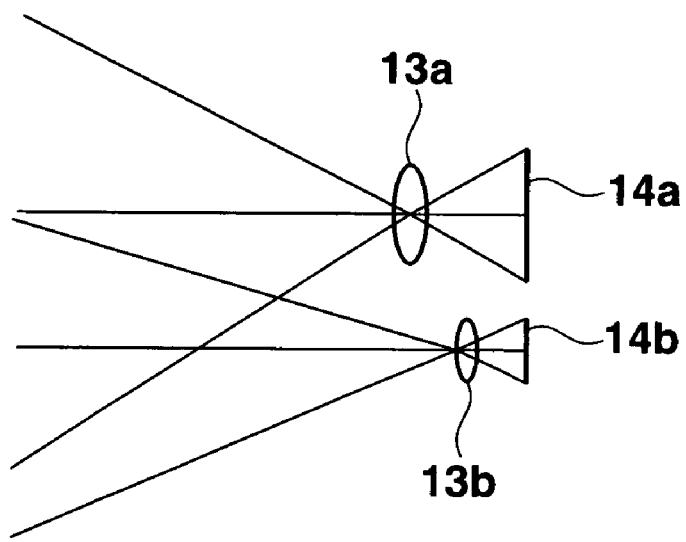
FIG. 7 is an illustration of another example of the digital camera according to the second embodiment of the present invention, which includes different lenses and different image pickup elements for picking up the actual image and for detecting a displacement between images.

In the first embodiment, the two optical systems (lenses) have the same field angle and the same magnification, and the two image pickup elements corresponding to the optical systems have the same size and the same number of pixels. However, the present invention can be achieved without necessarily using the same optical systems or the same image pickup elements, as illustrated in FIGS. 6 and 7. FIG. 6 illustrates lenses 13a and 13b that differ in magnification and image pickup elements 14a and 14b that differ in size and the number of pixels. FIG. 7 illustrates lenses 13a and 13b that differ in field angle.

Figure 8:
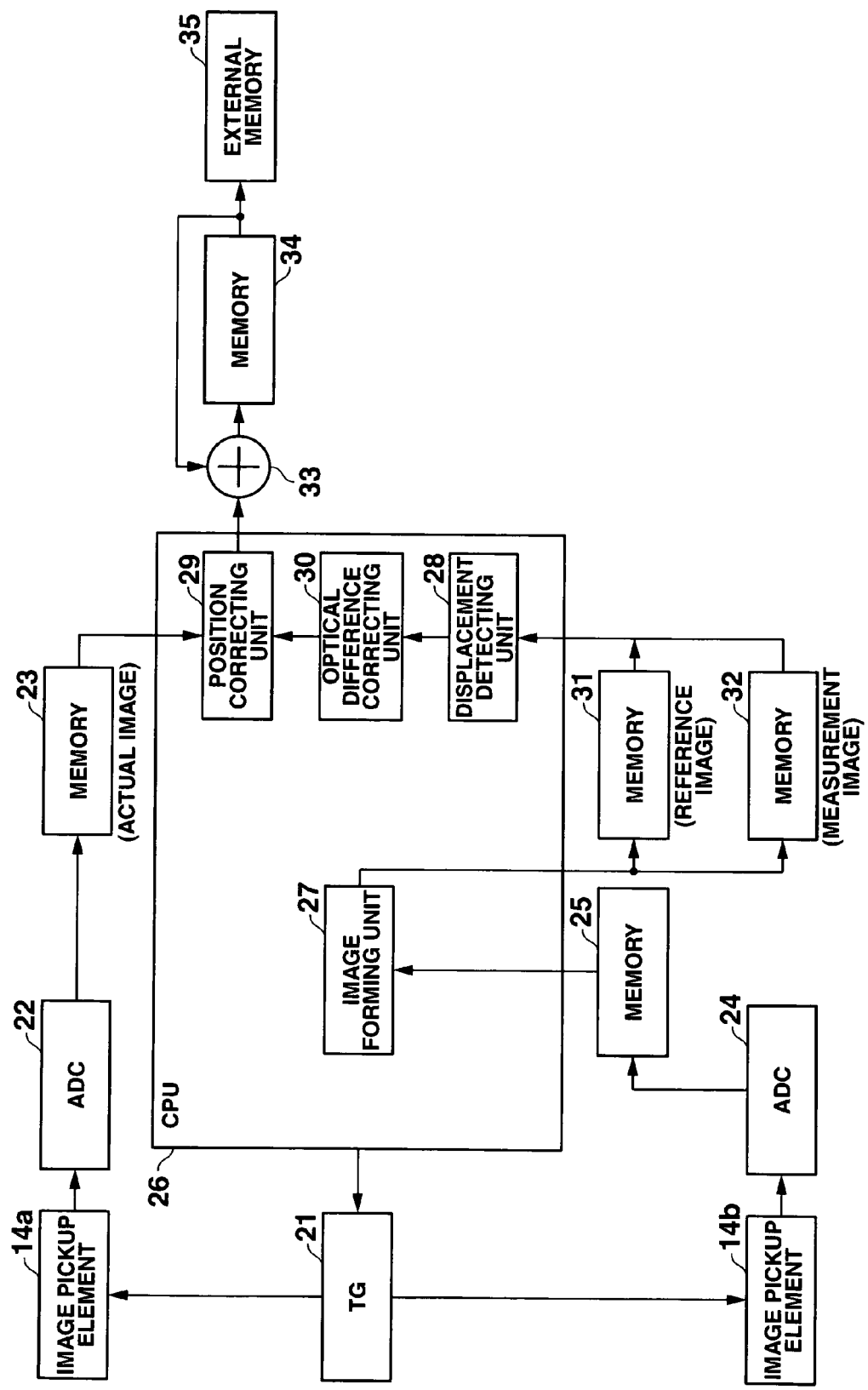
FIG. 8 is a block diagram of the digital camera according to the second embodiment.

FIG. 8 is a block diagram of the circuit arrangement of a digital camera according to the second embodiment. The same components as those of the circuit arrangement shown in FIG. 4 (first embodiment) are denoted by the same reference numerals and their descriptions will be omitted.

The digital camera of FIG. 8 differs from that of FIG. 4 in that the CPU 26 includes an optical difference correcting unit 30. The unit 30 considers a difference between image data items obtained from the image pickup elements 14a and 14b and makes an amount of displacement computed by the displacement detecting unit 28 correspondent to the coordinate system of image data obtained from the image pickup element 14a.

The position correcting unit 29 corrects the position of the image data or the actual image, which is stored in the memory 23, using the amount of displacement corrected by the optical difference correcting unit 30.

An operation of the digital camera according to the second embodiment will be described below.

The operation is performed when a given program is loaded into the CPU 26 serving as a microcomputer.

Figure 9:
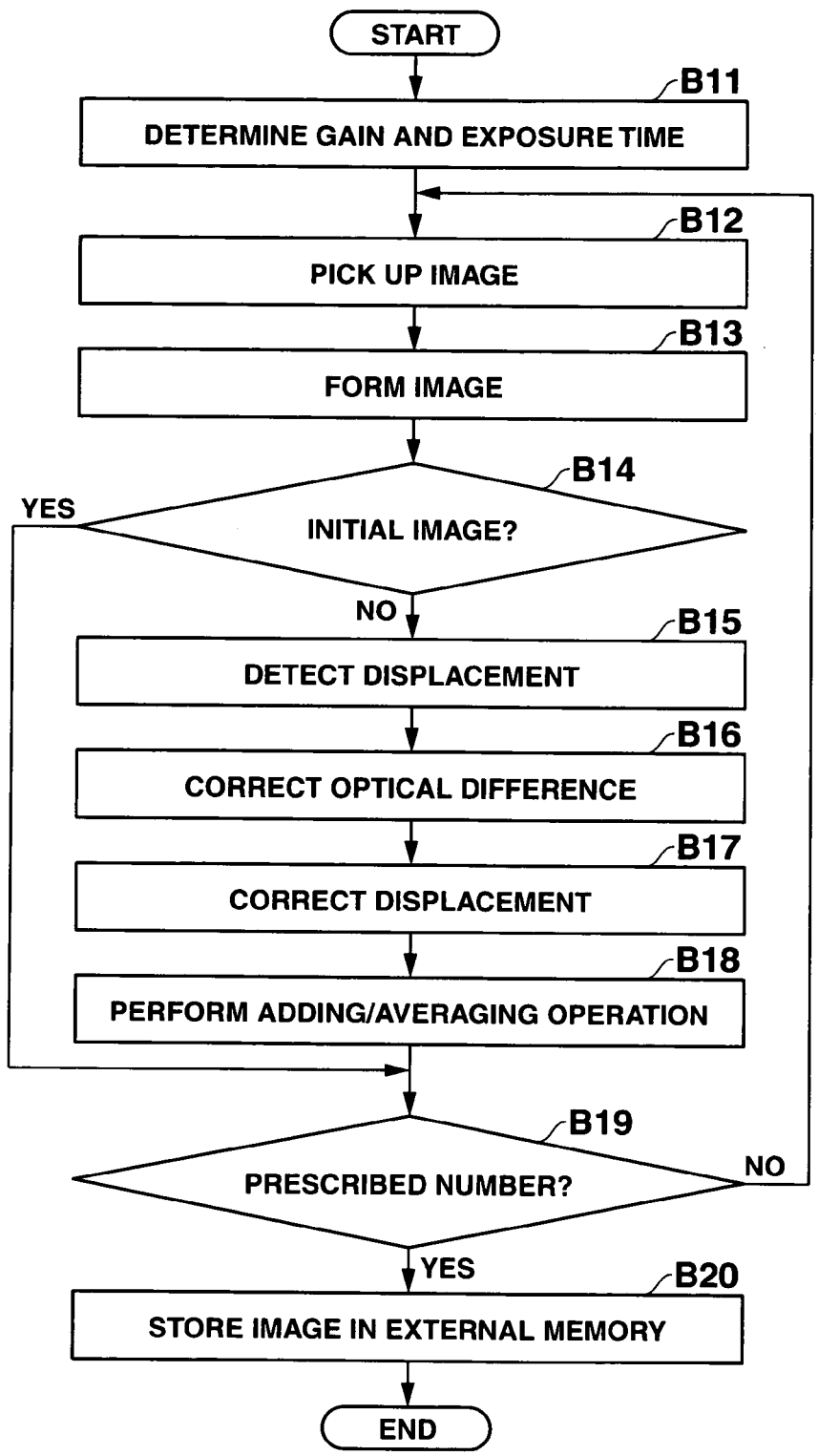
FIG. 9 is a flowchart showing a procedure for image processing of the digital camera according to the second embodiment.

FIG. 9 is a flowchart of the operation. The operation is performed to align a plurality of image data items (still images), which are obtained by continuous image pickup, and combine the image data items into an image whose blur has been corrected.

The flowchart shown in FIG. 9 is basically the same as that shown in FIG. 5 corresponding to the first embodiment. The operation of the second embodiment differs from that of the first embodiment in the addition of optical difference correction in step B16.

First, a gain and exposure time are set in the image pickup element 14a in accordance with the output status of the element 14a. The same exposure time is set for the image pickup element 14b, as is a gain that conforms to the output range of the ADC (step B11).

When the shutter key 12 is depressed to give an instruction to take a picture, the image pickup elements 14a and 14b are driven with the same timing in accordance with the gain and exposure time set in step B11, and image data for one picture is stored in each of the memories 23 and 25 through the corresponding one of the AD converters 22 and 23 which correspond to the picked-up elements 14a and 14b (step B12).

The initial image data item stored in the memory 25 is processed in such a manner that the image forming unit 27 can easily detect a displacement and then the processed data item is stored in the memory 31 as a reference image (step B13). On the other hand, the initial image data item stored in the memory 23 is stored in the memory 34 as the initial image without any position correcting process or adding/averaging process (step B14).

It is then determined whether the processing of a prescribed number of images to be combined is completed (step B19). If the number of images does not reach the prescribed number (No in step B19), the flow returns to step B12, and the image data items subsequent to the initial image data item are sequentially picked up at regular time intervals. In this case, the actual image data item that is obtained from the image pickup element 14a is stored in the memory 23 and the image data item that is obtained from the image pickup element 14b is stored in the memory 25 in the second shot. After that, these image data items are processed by the image forming unit 27 and stored in the memory 32 as a measurement image. The initial image data item is stored in the memory 31 as a reference image.

The image data items stored in the memories 31 and 32 are supplied to the displacement detecting unit 28. The displacement detecting unit 28 thus computes an amount of displacement between the image data items due to a camera shake (step B15).

According to the second embodiment, the amount of displacement computed by the displacement detecting unit 28 is supplied to the optical difference correcting unit 30. When the image pickup elements 14a and 14b differ in size and the number of pixels, the amounts of displacement of images picked up by these elements are the same, but the pixels of the elements 14a and 14b differ in size. On the basis of the differences in size and the number of pixels between the image pickup elements 14a and 14b, the displacement detecting unit 28 corrects the amount of displacement computed from image B in accordance with the coordinate system of image A. The same is true of the case where the lenses 13a and 13b differ in magnification and field angle. On the basis of the differences in magnification and field angle, the above amount of displacement is corrected in accordance with the coordinate system of image A (step B16).

The amount of displacement so corrected is supplied to the position correcting unit 29. On the basis of the corrected amount of displacement, the unit 29 corrects the position of the second actual image stored in the memory 23 such that it confirms to the initial image (step B17).

The second actual image whose displacement has been corrected is supplied to the adding/averaging unit 33. The unit 33 adds the luminance values of pixels of the actual image and those of pixels of the initial image stored in the memory 34 together and then averages the added values (step B18).

A prescribed number of images are continuously picked up in the same manner as described above. The actual images subsequent to the initial image, the displacement of which has been corrected, are added to the initial image and the added images are averaged to form a composite image. This composite image is stored in the memory 34.

When the processing of a prescribed number of images is completed (Yes in step B19), the composite image is supplied from the memory 34 to the external memory 35 as an image whose blur has been corrected, and compressed and stored therein (step B20).

In the second embodiment, the optical systems for picking up the actual image and for detecting a displacement are different and so are the image pickup elements as described above. If, however, the amount of displacement between images, which is computed by the image pickup element for detecting a displacement, is corrected in correspondence with the coordinate system of images obtained by the image pickup element for picking up the actual image, the same advantages as those of the first embodiment can be obtained.

Third Embodiment

A third embodiment of the present invention will be described below.

Figure 10:
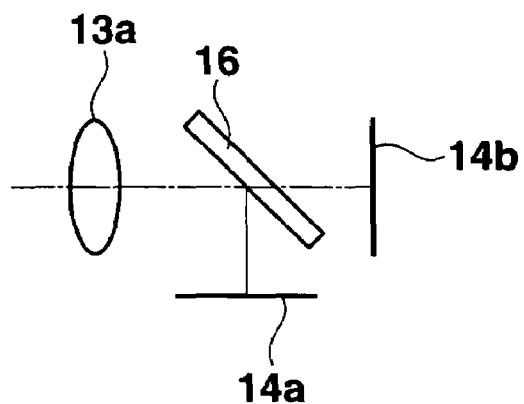
FIG. 10 is an illustration of an image pickup system using a cold mirror of a digital camera according to a third embodiment of the present invention.

In the first and second embodiments, the lens 13a for picking up the actual image and the lens 13b for detecting a displacement are provided separately from each other. In contrast, the digital camera according to the third embodiment includes one lens 13a as an optical system, and light incident through the lens 13a is split into visible light and infrared light by a cold mirror 16, as illustrated in FIG. 10.

The cold mirror 16 is provided on the optical axis of the lens 13a at a given angle. An image pickup element 14b for detecting a displacement is provided behind the optical axis. Another image pickup element 14a for picking up the actual image is provided on the light-reflection side of the cold mirror 16.

Figure 11:
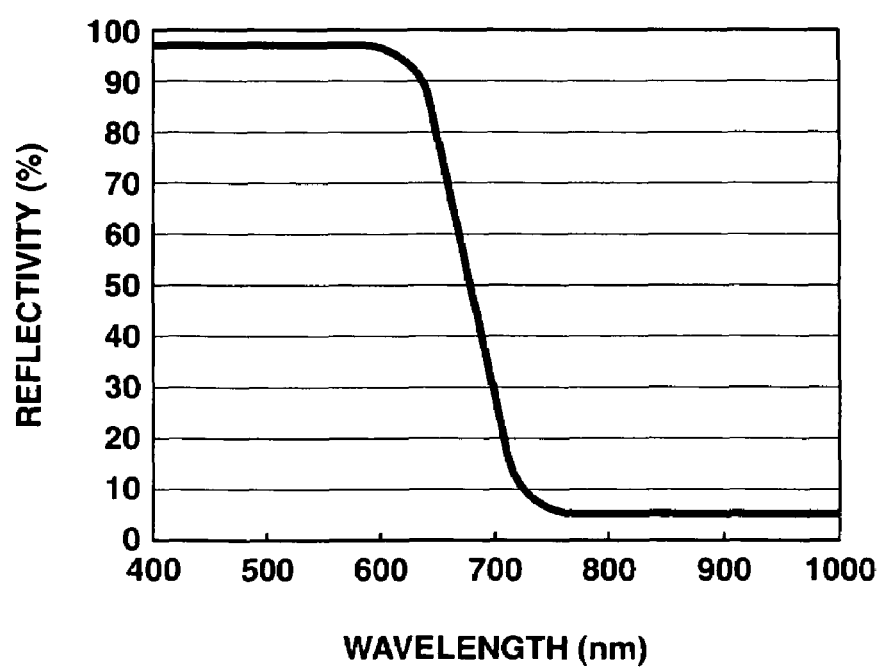
FIG. 11 is a graph of reflection property of the cold mirror of the digital camera according to the third embodiment.

FIG. 11 is a graph of reflection property of the cold mirror 16. According to the reflection property, the cold mirror 16 reflects visible light having a wavelength range of 400 nm to 700 nm and transmits infrared light having a wavelength of 700 nm or longer.

In the above arrangement, when an image is picked up, the visible-light components of light incident through the lens 13a are reflected by the cold mirror 16 and supplied to the image pickup element 14a. On the other hand, the infrared components of the incident light are supplied to the image pickup element 14b through the cold mirror 16. If an image pickup element having high sensitivity corresponding to the infrared region is used as the element 14b, an amount of displacement between images can be detected with high precision and a composite image whose blur is corrected can be formed even when the image is picked up at low light level.

Application Example

The first and second embodiments are directed to a digital camera for picking up a still image. However, the present invention can be applied to a technique of picking up a moving image.

In order to form still images with no blur, the SN ratio is improved at low light level by aligning and superposing a plurality of images obtained by continuous image pickup. If, however, an amount of displacement between images, which is computed by an image pickup element for detecting a displacement, is applied to the actual image and output in real time without superposing the images, a blur of moving images can be corrected in the same manner as that of still images.

Figure 12:
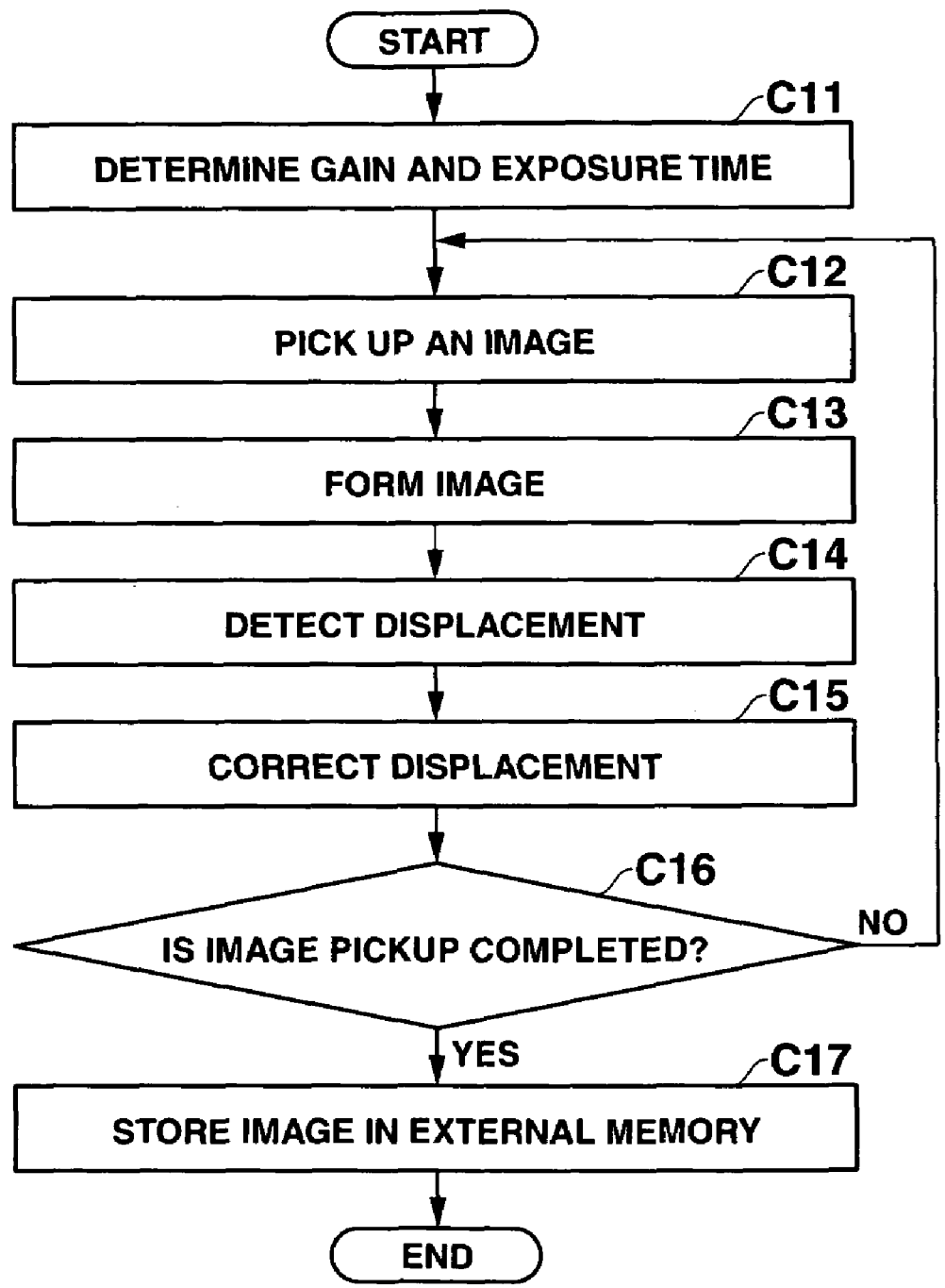
FIG. 12 is a flowchart showing a process for processing a moving image in the present invention.

FIG. 12 is a flowchart showing a process for processing a moving image. This process is carried out when a given program is loaded into the CPU 26 serving as a microcomputer. Though not shown in particular, a circuit arrangement for processing a moving image can be achieved by eliminating the averaging unit 33 and memory 34, both of which are components for forming a composite image, from the circuit shown in FIG. 4 corresponding to the first embodiment.

Describing a process for picking up a moving image in brief taking the arrangement shown in FIG. 4 as an example, the gain and exposure time of two image pickup elements 14a and 14b are set (step C11), and a shutter key 12 is depressed to start picking up a moving image (step C12).

As in the still-image pickup, the image pickup element 14a is used for picking up the actual image, and the image data items, which are obtained in sequence for each frame from the element 14a, are stored in the memory 25 via the AD converter 24.

The image data items stored in the memory 25 are processed by the image forming unit 27 and then alternately stored in the memories 31 and 32 (step C13). The image data items are supplied to the displacement detecting unit 28 from the memories 31 and 32. Using these image data items, an amount of displacement between images due to a camera shake is computed using two image data items (step C14). On the basis of the amount of displacement, the position correcting unit 29 corrects the position of the actual image stored in the memory 23 (step C15).

As described above, an amount of displacement is computed using displacement detecting image data items that are obtained in sequence from the image pickup element 14b and applied in real time to actual-image picking-up image data items that are obtained in sequence from the image pickup element 14a, thereby correcting a displacement due to a camera shake. This process is repeated until the shutter key 12 is depressed again to give an instruction to complete picking up a moving image. When the instruction is given (Yes in step C16), moving image data composed of images whose positions have been corrected is compressed in given format and stored in the external memory 35 (step C17).

The second embodiment can be applied to the above moving-image pickup operation. Even though the lenses 13a and 13b are not the identical or the image pickup elements 14a and 14b are not the identical, the second embodiment can be applied by providing the optical difference correcting unit 30 shown in FIG. 8.

Moreover, the present invention can be applied to not only digital cameras but also electronic devices having an image pickup function such as a cellular phone with a camera. The same advantages can be obtained from the electronic devices.

The techniques of the above embodiments can be applied to various devices as programs that can be executed by a computer. The programs can be written to the recording mediums of a magnetic disk (flexible disk, hard disk, etc.), an optical disk (CD-ROM, DVD-ROM, etc.), a semiconductor memory, and the like. The programs in themselves can be transmitted via a transmission medium such as a network. The computer loads a program that is recorded on the recording medium or a program that is transmitted via the transmission medium. The programs control the operation of the computer to perform the above process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image-capturing apparatus comprising:
    a first image pickup element which picks up an actual image of a subject;
    a second image pickup element which detects a displacement and has sensitivity that is higher than that of the first image pickup element;
    an image pickup unit which picks up an image of the subject by driving the first image pickup element and the second image pickup element simultaneously;
    a displacement detecting unit which computes an amount of displacement between images due to a camera shake using image data obtained from the second image pickup element when the image of the subject is picked up by the image pickup unit; and
    a position correcting unit which corrects a position of image data obtained from the first image pickup element, based on the amount of displacement computed by the displacement detecting unit.

2. The image-capturing apparatus according to claim 1, wherein the displacement detecting unit computes an amount of displacement by comparing at least two image data items that are continuously obtained from the second image pickup element.

3. The image-capturing apparatus according to claim 1, further comprising optical difference correcting unit which makes the amount of displacement computed by the displacement detecting unit correspondent with a coordinate system of image data obtained from the first image pickup element in consideration of a difference between the image data obtained from the first image pickup element and the image data obtained from the second image pickup element,
    wherein the position correcting unit corrects the position of the image data obtained from the first image pickup element, based on the amount of displacement corrected by the optical difference correcting unit.

4. The image-capturing apparatus according to claim 1, wherein:
    the first image pickup element is an image pickup element having a color filter; and
    the second image pickup element is an image pickup element having no color filter but used for picking up an image in monochrome.

5. The image-capturing apparatus according to claim 1, wherein:
    the first image pickup element has sensitivity within a visible-light region; and
    the second image pickup element has sensitivity outside the visible-light region.

6. The image-capturing apparatus according to claim 1, further comprising:
    a first lens provided in a main body of the image-capturing apparatus; and
    a second lens arranged in parallel with the first lens,
    wherein the first image pickup element receives light through the first lens, and the second image pickup element receives light through the second lens.

7. The image-capturing apparatus according to claim 1, further comprising:
    a lens provided in a main body of the image-capturing apparatus; and
    a splitting unit which splits light incident through the lens into a first wavelength range and a second wavelength range,
    wherein the first image pickup element receives light of the first wavelength range split by the splitting unit, and the second image pickup element receives light of the second wavelength range split by the splitting unit.

8. The image-capturing apparatus according to claim 7, wherein:

the splitting unit splits light incident through the lens into a wavelength range of a visible-light region and a wavelength range of an infrared region;

the first image pickup element has sensitivity within the light-visible region; and the second image pickup element has sensitivity within the infrared region.

9. An image processing method applied to an image-capturing apparatus including a first image pickup element which picks up an actual image of a subject and a second image pickup element which detects a displacement and has sensitivity that is higher than that of the first image pickup element, comprising:

picking up an image of the subject by driving the first image pickup element and the second image pickup element simultaneously;

computing an amount of displacement between images due to a camera shake using image data obtained from the second image pickup element when the image of the subject is picked up; and correcting a position of image data obtained from the first image pickup element, based on the amount of displacement computed.

10. A program product recorded in a computer-readable recording medium and executed by a computer for controlling an image-capturing apparatus including a first image pickup element which picks up an actual image of a subject and a second image pickup element which detects a displacement and has sensitivity that is higher than that of the first image pickup element, comprising:

causing the computer to perform a first function of picking up an image of the subject by driving the first image pickup element and the second image pickup element simultaneously;

causing the computer to perform a second function of computing an amount of displacement between images due to a camera shake using image data obtained from the second image pickup element when the image of the subject is picked up by the first function; and causing the computer to perform a third function of correcting a position of image data obtained from the first image pickup element, based on the amount of displacement computed by the second function.

* * * * *